No. 697,200. Patented Apr. 8, 1902.
J. S. COPELAND.
TRANSMITTING GEAR.
(Application filed Sept. 16, 1901.)
(No Model.) 2 Sheets—Sheet 2.
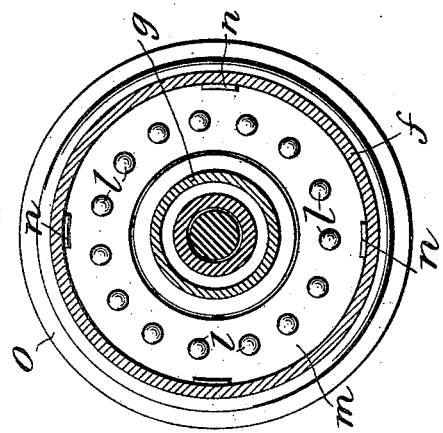
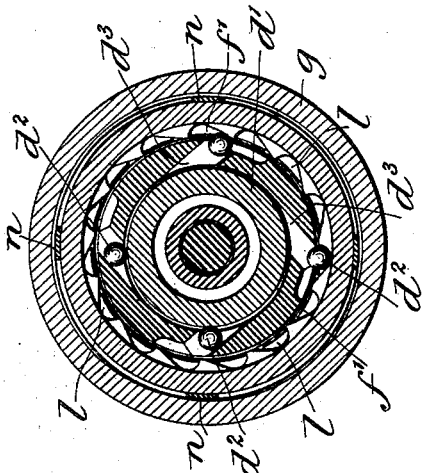
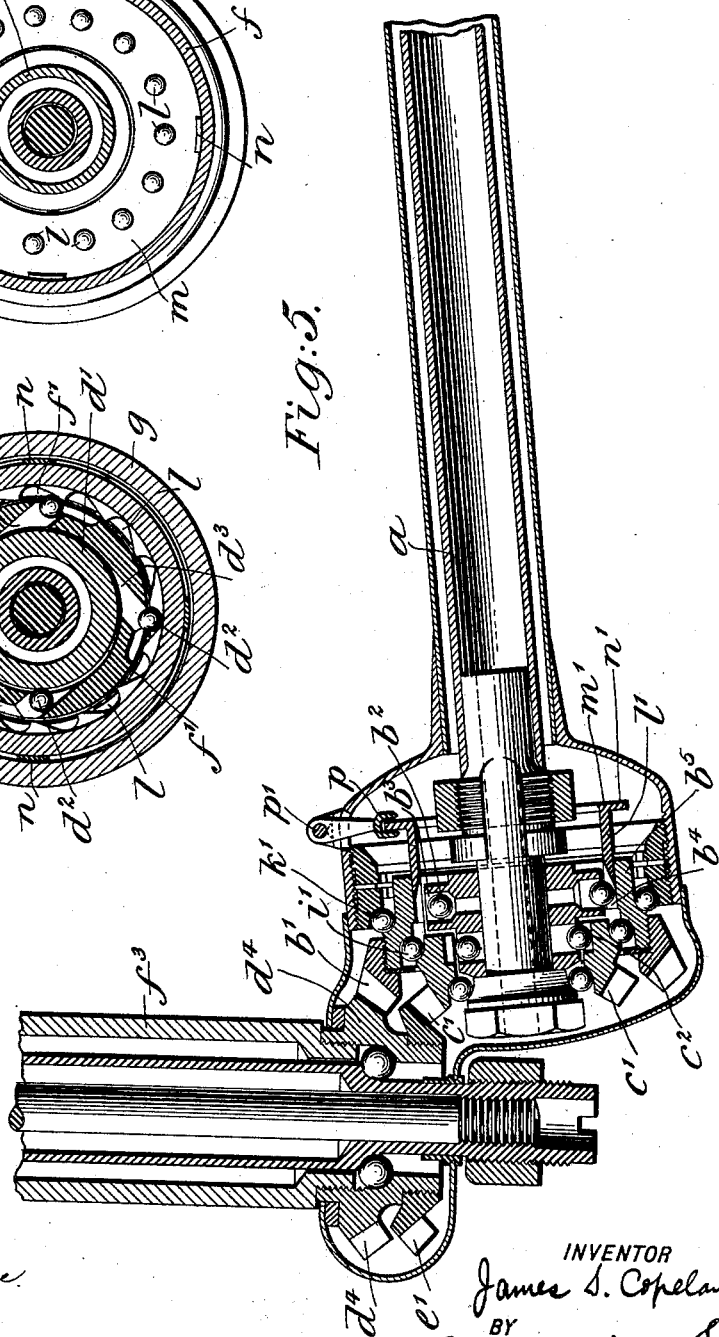
WITNESSES:
John A. Rennie
Lucius E. Varney
INVENTOR
James S. Copeland
BY
Redding, Kiddle & Greeley
his ATTORNEYS.

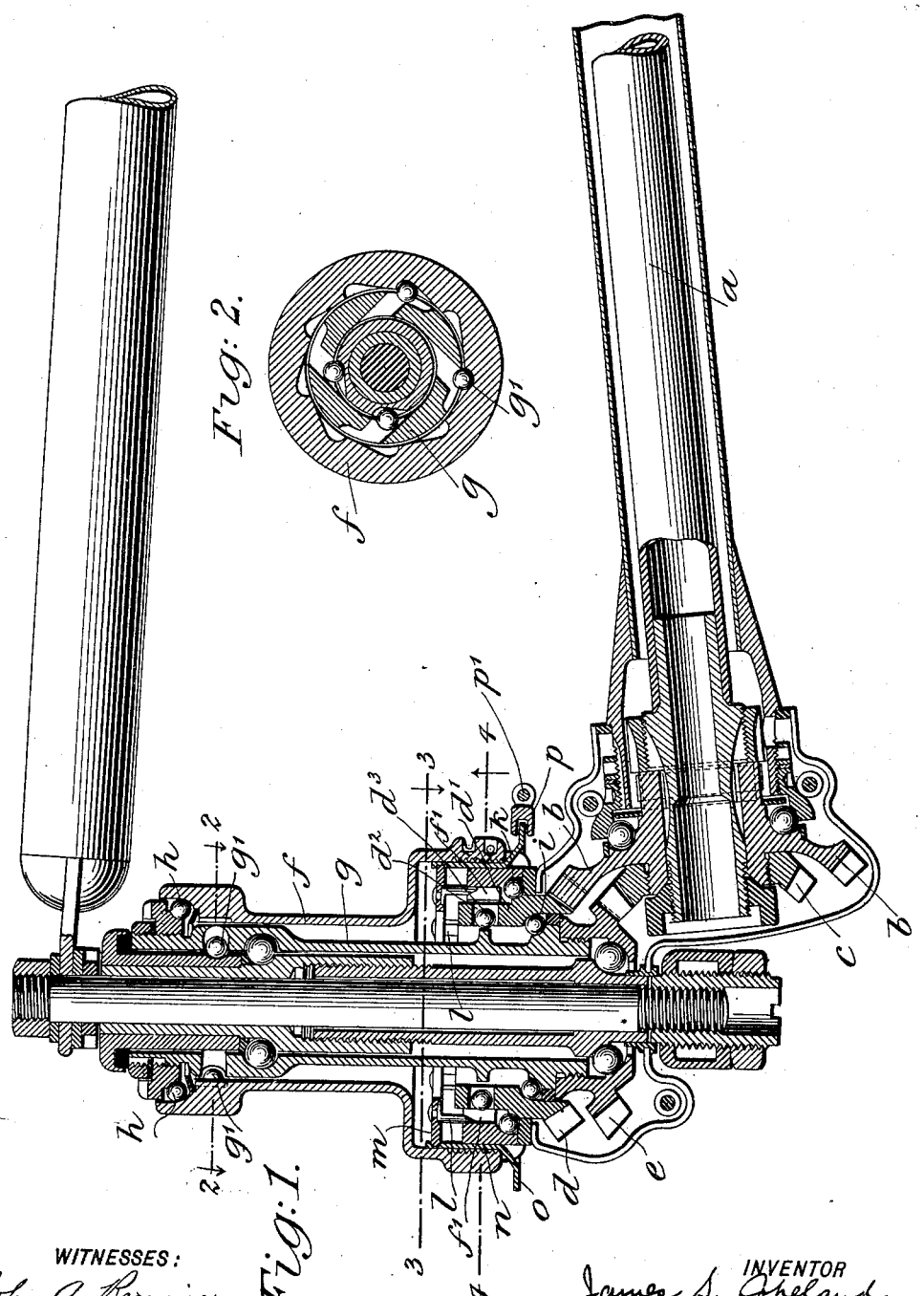

UNITED STATES PATENT OFFICE.

JAMES S. COPELAND, OF HARTFORD, CONNECTICUT, ASSIGNOR TO AMERICAN BICYCLE COMPANY, OF JERSEY CITY, NEW JERSEY, AND NEW YORK, N.Y., A CORPORATION OF NEW JERSEY.

TRANSMITTING-GEAR.

SPECIFICATION forming part of Letters Patent No. 697,200, dated April 8, 1902.

Application filed September 16, 1901. Serial No. 75,655. (No model.)

*To all whom it may concern:*

Be it known that I, JAMES S. COPELAND, a citizen of the United States, whose residence is the city of Hartford, county of Hartford, State of Connecticut, have invented new and useful Improvements in Transmitting-Gears, of which the following is a specification, reference being had to the accompanying drawings.

The object of the invention is to improve the construction of transmitting-gears, and particularly to provide an improved transmitting-gear by means of which it shall be possible at will to change the speed of the driven part.

The invention is particularly applicable to cycles and other vehicles, and more especially to vehicles of this description in which the power is transmitted through a shaft, as distinguished from a chain; but it will be obvious that the invention is not limited to the particular use herein referred to, but is capable of application to many different uses in which a change of speed is desired from time to time.

For the purpose of illustration and explanation as to the nature of the invention it is represented in slightly different forms in the accompanying drawings as applied to a chainless bicycle, and in such drawings—

Figure 1 is a view in horizontal section of a rear hub of a bicycle and its appurtenances, together with a portion of a power-transmitting shaft and its appurtenances, portions of the rear fork of the bicycle being also shown. Fig. 2 is a detail sectional view on a plane indicated by the line 2 2 of Fig. 1. Fig. 3 is a detail sectional view on a plane indicated by line 3 3 of Fig. 1 looking in the direction of the arrow thereon. Fig. 4 is a detail sectional view on a plane indicated by line 4 4 of Fig. 1 looking in the direction of the arrow thereon. Fig. 5 is a partial view similar to Fig. 1, but illustrating a slightly different arrangement of the gearing.

Referring to the embodiment of the invention illustrated in Fig. 1 of the drawings, the driving-shaft $a$, which is represented as the power-transmitting shaft of a chainless bicycle, is supported in suitable bearings in a frame, which are not necessary to be referred to herein. So far as the present invention is concerned it stands for any driver and will be so referred to hereinafter. Upon the driver are carried in any suitable manner two gears, marked $b$ and $c$, respectively, one of said gears being shown as larger than the other, although both might be of the same size. In the arrangement shown in said Fig. 1 both gears are fast upon the driver $a$ and rotatable therewith, meshing, respectively, with corresponding driven gears $d$ and $e$, the gears of each intermeshing pair being so proportioned as to give the driven part, with which the gears $d$ and $e$ are connected, the desired speed relative to the speed of the driver $a$. Both pairs of gears are always in mesh, the fast-speed gear $d$ being a loose or floating gear which is uncoupled from the driven part when slow speed is desired, while the slow-speed gear $e$ is coupled to the driven part through a loose driving-clutch, which is so constructed as to permit the driven part to overrun the slow-speed gear $e$ when the fast-speed gear $d$ is operative and to cause the slow-speed gear to drive when the fast-speed gear is not operative. The driven part in this instance is shown as the hub $f$ of the driven wheel, being supported for rotation upon a sleeve $g$ by a suitable ball-bearing $h$ at one end and at the other end by other ball-bearings $i$ and $k$, which receive between them the sleeve-like hub $d'$ of the fast gear $d$. In other words, said gear $d$ floats on ball-bearings $i$ and $k$, between the sleeve $g$ and the hub or driven part $f$. Said gear $d$ is arranged to be clutched or unclutched to or from the driven part $f$ at will, and for this purpose pawls are provided the engagement of which may be controlled by the operator. As shown, the sleeve or hub $d'$ of the gear $d$ constituting the driving member of a clutch is provided with pockets $d^2$ to receive balls $d^3$, said balls being adapted to enter when permitted part way into recesses $f'$ in the driven part $f$ or in an annulus which is carried by said driven part constituting the toothed or ratchet member of the clutch. When such pawls or balls rest partly in the recesses $f'$, as represented in Fig. 2, they couple the floating gear $d$ and the driven part, so that said driven part rotates with the gear. In order to hold the balls out of the recesses $f'$, a device is arranged to be moved longitudinally between the gear-sleeve and the recesses, so as to retain the balls in the pockets $d^2$. As shown in Fig. 1, the ball-retaining device consists of a series of pins $l$, which are suitably shaped and beveled and are carried by a ring $m$. The latter is attached, by means of arms $n$, which slide through suitable openings formed in the outer wall of the annulus, to an outer ring $o$. A suitable fork (indicated in part at $p$) engages said ring and is arranged to be shifted by any suitable means, such as a rock-shaft $p'$.

As is usual in cycles, the rear-wheel hub or driven part $f$ is arranged to overrun or run faster than its driver, as in coasting. For this purpose a suitable loose driving-clutch may be interposed, as indicated above, at some convenient point between the driven part and the driver, such a clutch being indicated in Fig. 1 by balls $g'$, which are carried in pockets in the sleeve $g$ and are adapted to engage inclined recesses in the hub or driven part $f$, the arrangement of such pockets and recesses being such as to permit the hub to run faster than the sleeve, but coupling the two when it is desired to drive the hub through the sleeve. The construction of such clutch is well understood and requires no further description herein.

It is obviously immaterial so far as the general purposes of the invention are concerned whether the loose or floating gear is carried by the driver or by the driven part, and in Fig. 5 is shown a construction in which said loose or floating gear is carried by the driver and the slow-speed gear is coupled to the driver by a loose driving-clutch which permits said slow-speed gear to run faster than the driver. In said Fig. 5 of the drawings the driver is represented, as before, by a power-transmitting shaft $a$, the slow-speed gear $c'$ being mounted loosely thereon and arranged to be driven thereby through the medium of a ball-clutch $c^2$, which is of ordinary construction, permitting the gear to run faster than the driver. The fast-speed gear $b'$ in this construction is shown as a loose gear floating between inner and outer ball-bearings $i'$ and $k'$, the outer, $k'$, being supported by the frame or case in the usual manner. The gears $b'$ and $c'$ mesh, respectively, with gears $d^4$ and $e'$, both of which may be fast upon the hub or driven part $f^3$. The loose or floating gear $b'$ is arranged to be coupled to or uncoupled from the driver by a suitable clutch, which may be controlled by the operator, such clutch comprising balls $b^2$, which are received in pockets $b^3$ in the hub or driver and are adapted to engage recesses $b^4$ in the encircling sleeve $b^5$ of the fast gear $b'$, which thus become the toothed or ratchet members of the clutch. When the balls are permitted to drop part way into the recesses $b^4$, the gear is compelled to rotate with the driver; but when they are retained in the pockets $b^3$ then the fast gear is uncoupled from the driver and rotates at the speed of the driven part. To retain the balls in the pockets, a sleeve $l'$ is arranged to slide between the hub of the driver and the sleeve of the gear, such sleeve being carried by a ring $m'$, which may be engaged by a fork, (indicated at $p$ in said Fig. 5,) the fork being operated by any suitable means, such as a rock-shaft $p'$.

Other changes in the relative arrangement of the driver and driven parts and of the fast and slow speed gears will undoubtedly suggest themselves in view of the foregoing, and therefore it is understood that the invention is not limited to the precise construction and arrangement of parts shown and described herein.

I claim as my invention—

1. Transmitting-gearing comprising a driver, a driven part, intermeshing gears carried by said driver and driven part respectively, and a clutch interposed between one of said gears and its carrier, said clutch comprising a driving member, engaging parts positively carried thereby, a toothed member and means adapted to be inserted between the engaging parts and the toothed member to retain the engaging parts out of engagement with the toothed member.

2. Transmitting-gearing comprising a driver, a driven part, intermeshing gears carried by said driver and driven part respectively, and a clutch interposed between one of said gears and its carrier, said clutch comprising a driving member having pockets, a member having recesses, balls disposed in said pockets and adapted to engage said recesses, and means to retain said balls in said pockets.

3. Transmitting-gearing comprising a driver, a driven part, intermeshing gears carried by said driver and driven part respectively, and a clutch interposed between one of said gears and its carrier, said clutch comprising a driving member having pockets, a member having recesses, balls disposed in said pockets adapted to engage said recesses, one of said members encompassing the other, and a ring movable longitudinally with respect to said members and having fingers to enter between said members and to retain the balls in said pockets.

4. Transmitting-gearing comprising a driver, a driven part, intermeshing slow-speed gears and intermeshing fast-speed gears carried by said driver and driven part, a loose driving-clutch interposed between one of said slow-speed gears and its carrier to drive when the fast-speed gear is not operative and to permit one part to overrun the other when the fast-speed gear is operative, a driving-clutch interposed between one of the fast-speed gears and its carrier and means to hold said last-named clutch out of operation.

5. Transmitting-gearing comprising a driver, a driven part, intermeshing slow-speed gears and intermeshing fast-speed gears carried by said parts, a loose driving-clutch interposed between one of the slow-speed gears and its carrier and a driving-clutch interposed between one of the fast-speed gears and its carrier, said last-named clutch comprising a driving member, engaging parts and a toothed member, and means to retain said engaging parts out of engagement with said toothed member.

6. A two-speed gear comprising a driver, a driven part, intermeshing slow-speed gears and intermeshing fast-speed gears carried by said parts, a loose driving-clutch interposed between one of the slow-speed gears and its carrier and a driving-clutch interposed between one of the fast-speed gears and its carrier, said last-named clutch comprising a driving member having pockets, a member having recesses and balls disposed in said pockets and adapted to engage said recesses, and means to retain said balls in said pockets.

7. Transmitting-gearing comprising a driving-shaft, a driven part, intermeshing slow-speed bevel-gears and intermeshing fast-speed bevel-gears carried by said driving-shaft and said driven part, a loose driving-clutch interposed between one of said slow-speed gears and its carrier, a driving-clutch interposed between one of the fast-speed gears and its carrier and means operable to control said last-named clutch.

8. Transmitting-gearing comprising a driver, a driven part, a fast and slow speed gear fixed on one of said parts, intermeshing fast and slow speed gears carried on the other of said parts, a loose driving-clutch interposed between the last-named slow-speed gear and its carrier to drive when the fast-speed gear is not operative and to permit one part to overrun the other when the fast-speed gear is operative, a driving-clutch interposed between the last-named fast-speed gear and its carrier and means operable to control the engagement of said last-named clutch.

This specification signed and witnessed this 29th day of August, A. D. 1901.

JAMES S. COPELAND.

In presence of—
LUCIUS E. VARNEY,
JOHN M. SCOBLE.